United States Patent [19]

Bateson et al.

[11] Patent Number: 4,486,342

[45] Date of Patent: Dec. 4, 1984

[54] RECOVERY OF PROTEIN USING SHEAR

[75] Inventors: George F. Bateson, Roseville; Douglas Arndt, Champlin; Steven R. Boyer, St. Paul, all of Minn.

[73] Assignee: Henkel Corporation, Minneapolis, Minn.

[21] Appl. No.: 475,803

[22] Filed: Mar. 16, 1983

[51] Int. Cl.³ ............................. A23J 1/14; A23J 1/12
[52] U.S. Cl. ............................. 260/112 G; 260/123.5; 426/656
[58] Field of Search ............. 260/112 G, 112 R, 123.5

[56] References Cited

U.S. PATENT DOCUMENTS

| | | | |
|---|---|---|---|
| 2,687,877 | 8/1954 | Jensen | 259/8 |
| 2,928,821 | 3/1960 | Chayen | 260/123.5 |
| 3,081,069 | 3/1963 | Oakes | 259/8 |
| 3,090,779 | 5/1963 | Chayen | 260/123.5 |
| 3,583,872 | 6/1971 | Wilding et al. | 260/123.5 |
| 3,649,293 | 3/1972 | Hoer et al. | 260/123.5 |
| 3,951,938 | 4/1976 | Kerkkonen et al. | 260/112 G |
| 4,364,862 | 12/1982 | Teranishi et al. | 260/112 R |

*Primary Examiner*—Howard E. Schain
*Attorney, Agent, or Firm*—Patrick J. Span; Ernest G. Szoke

[57] ABSTRACT

The present invention deals with an improved process for recovering protein.

12 Claims, No Drawings

4,486,342

RECOVERY OF PROTEIN USING SHEAR

BACKGROUND OF THE INVENTION

1. Field of the Invention

This invention relates primarily to the treatment of cereal grains to recover the starch and protein fractions.

2. Description of the Art Practices

U.S. Pat. No. 3,951,938 issued to Kerkkonen et al on Apr. 20, 1976 describes a process for separating the components of a cereal grain into a starch and gluten fraction. The '938 process is stated to be advantageous over the Martin process which while initially using small quantities of water eventually uses larger quantities of water than the '938 process. The differences between the presently described process and the '938 process are described in detail infra.

The agglomeration of protein is a necessary step as conventional processing requires that the protein be screened to be recovered. The larger the agglomerates of protein are, the easier the screening process is conducted. More importantly, when the protein is efficiently agglomerated less is lost to the waste stream.

Throughout the specification and claims percentages and ratios are by weight and temperatures are in degrees Celsius unless otherwise noted. U.S. Pat. No. 3,951,938 is herein incorporated by reference.

SUMMARY OF THE INVENTION

This invention describes a process for agglomerating protein comprising subjecting an aqueous dispersion of protein to shear wherein the shear rate is not greater than 2000 reciprocal seconds and the aqueous dispersion is subjected to a gap of 2.28 mm or less during the shear to cause the protein to agglomerate.

There is further described a process for agglomerating protein comprising subjecting a protein concentrate which is a mixture of starch, protein and water to a shear to assist in agglomerating the protein wherein the maximum shear rate is not greater than 2000 reciprocal seconds and the protein concentrate during the shear is subjected to a gap of 2.28 mm or less to cause the protein to agglomerate.

DETAILED DESCRIPTION OF THE INVENTION

The present invention starts with a protein source such as a cereal grain or soy beans. While the present invention is most practically concerned with wheat, other cereal grains such as rye or barley may also be processed for recovery of the protein content. The protein content of a cereal grain comprises soluble protein and insoluble protein also referred to as gluten. The largest protein fraction is the gluten and therefore the terms protein and gluten may be used interchangeably. Any convenient source of the cereal may be obtained, it being highly preferred to use hard red winter and hard red spring wheats. The process may be conducted using other sources of protein such as a second clear flour.

The protein source from a cereal grain is appropriately milled to a desired size thereby forming a flour. The flour is mixed in a weight ratio of from about 1.2 to about 2.0 parts of water per part of the flour at a temperature of from about 30° C. to about 60° C. to form a suspension of the flour in water. Thereafter, the flour is subjected to a homogenizing operation such that the suspension of flour in water becomes a free-flowing dispersion. The foregoing step may be accomplished by passing the suspension through a pin-mill type mixer as described in U.S. Pat. No. 3,081,069 issued to E. T. Oakes on Mar. 12, 1963 or U.S. Pat. No. 2,687,877 issued to Thormond Jensen on Aug. 31, 1954 both of which are incorporated by reference.

The dispersion is then separated into two fractions comprising a starch and a second less dense portion comprising a protein concentrate. The first portion is often referred to as an A-starch which is of high quality as it is substantially free of protein and contains less damaged (broken) particles than the starch remaining within the protein concentrate.

It is desirable to extract as much of the protein present in the protein concentrate as is possible. The starch fraction remaining is referred to as the B-starch which may be used where starch damage, particle size and protein content are not critical. The most valuable component of the protein concentrate is the gluten.

The method for removing the B-starch according to the '938 patent is to allow that protein concentrate fraction to stand free of agitation without dilution at from 30° C. to 50° C. for from about 10 to about 90 minutes to form gluten thread-like formations without separation. Thereafter it is stated that at least one part of water per part of the protein concentrate is added and the diluted liquid is subjected to a beating action to agglomerate the protein formations with one another and to squeeze water containing the non-protein solids substantially out of the agglomerate. It is stated in the '938 patent that the desirable homogenization effect for treating a protein concentrate is at between 400 and 900 rpms in a pin-mill.

Generally, the present invention follows the proceeding discussion, except that the protein concentrate fraction following the resting stage (10 to 90 minutes at from 30° to 60° C.) is subjected to a pin-mill at a maximum shear as measured in reciprocal seconds of not greater than 2,000; preferably from about 1500 to about 100, most preferably from about 1000 to about 110 reciprocal seconds. The unit of measurement chosen is without referrence to the type of equipment employed although a pin-mill of the rotary type is preferred.

Substantially similar conditions are employed in recovering soy or other proteins. Soy protein is conveniently extracted from the remaining components of soy flour and the soy isolate agglomerated as described above.

The measurements and definitions used herein are as follows. The shear rate to which the protein concentrate is subjected is defined as the velocity of the outer diameter dynamic teeth of a pin-mill divided by the gap between the static and dynamic teeth of a pin-mill. This translates into a ratio which may simply be stated as velocity divided by gap. As the velocity is a function of the revolutions per minute such as where a rotary pin-mill is used, then velocity is equal to the revolutions per minute times the diameter of the pin-mill at a given point times pi. The equation is as shown below:

$$\text{shear rate} = (\text{velocity}/\text{gap})$$

OR $$\frac{\text{revolutions/minute} \times \text{diameter of the pin-mill} \times 3.1416}{\text{gap} \times 60 \text{ sec/minute}}$$

The values given for shear are the maximum shear in reciprocal seconds. That is, as the rotating teeth in the pin-mill operate fastest at the outer diameter of the pin-mill, the maximum shear to which the protein concentrate is subjected will be determined by the maximum outer diameter of the teeth. Thus the measurement for shear uses the inner surface of the outer most tooth when measured from the axis about which the pin-mill operates. The gap will then be measured from the outer surface of the outermost static plate teeth to the inner surface of the outermost teeth on the dynamic plate when both teeth are radially aligned.

It is known that the '938 patent process in practice has employed the gap in the pin-mill set at 0.120 inches (3.05 millimeters). It is further known that the revolutions per minute at which the pin-mill is set is 1200 rpm. By applying these figures in the formulas given above, it will be observed that the process of the '938 patent is dependent upon a shear of 7,330 reciprocal seconds.

The gap setting has been determined in the present invention to be as small as is practically possible. It has been determined that the gap should be smaller than 0.090 inches (2.28 mm), preferrably from about 0.010 to about 0.090 (0.255–2.28 mm), more preferrably from about 0.020 to about 0.085 (0.51–2.16 mm), and most preferrably from about 0.030 to about 0.075 (0.762–1.91 mm) inches.

As previously noted, the protein source is preferrably wheat. The protein concentrate employed is obtained after the A-fraction separation according to the '938 process. The aqueous protein concentrate contains from about 20% to about 35% solids (primarily starch, pentosans, and protein); of which about 20% to about 40% by weight is protein. Most preferrably the foregoing figures are from about 25% to about 30% solids of which at least 30% by weight is protein.

The residence time of the protein concentrate while it is subjected to the shear has been determined to be not particularly important to the overall gluten recovery. Increased residence time does enhance the washing out of the B-starch from the protein concentrate. The residence time during the shear for the protein concentrate is conveniently set at from 0.3 seconds to 40 seconds, preferrably from about 0.4 to about 25 seconds and most preferrably from about 0.5 to about 15 seconds.

Preferrably when employing a rotary pin-mill of the type described herein, the dynamic plate will be two-faced. The housing of the pin-mill then also contains two static plates, each respectively opposing the exposed teeth of the dynamic plate.

The following exemplifies the present invention.

EXAMPLE I

A continuous starch gluten extraction system is set up and run using a flour having a protein content of 12.9% by weight. The flour is fed into the vortex of a turbine mixer at a continuous rate of 3.0 lbs/minute using a K-tron feeder model T-35. Water at about 46° C. is also fed into the vortex of a Cowles turbine-mixed tank with the mixer turning at 1500 rpm at a constant rate of 3.9 lbs/minute such that the resultant batter temperature is about 40° C. The turbine-mixed tank has a volume of approximately 0.02 cubic feet. The flour/water mixture is pumped to a pin-mill type mixer by Oakes Machine (model 4M75A) turning at 2200 rpm with a 0.76 mm rotor to homogenize the batter. The homogenized batter is then pumped to a horizontal bowl centrifuge, Sharples model P660. The centrifuge is operating at 2800 G-force. The underflow is taken off as the essentially protein-free A starch stream.

The overflow (the protein concentrate) from the centrifugation are pumped to a water-jacketed storage vessel having sufficient volume to allow approximately 30 min. hold time. The overflow from the centrifuge is pumped into the top of the storage tank while the matured protein concentrate is pumped from the bottom of the tank to a pin-mill type mixer, Oakes model 4MV3A, having a rotor gap of 0.51 mm and turning at 150 rpm. The shear rate that the matured protein concentrate experiences is 1570 reciprocal seconds. Just prior to entering the pin-mill type mixer, an equal weight of fresh water is added to the matured overflow stream.

Upon discharge from the pin-mill type mixer, the stream is sent to a bar screen separator. The agglomerated gluten is recovered from the screen and collected over time to determine yield. The throughs from the screen represent the B-starch and waste stream. For this run the recovered protein, based on the protein in the feed flour, equaled 83.8% yield. The protein content is determined as $5.7 \times N$ (N = Kjeldahl Nitrogen).

EXAMPLE II

The system, as in Example I is run at a flour flow rate of 1.6 lbs/minute using an Oakes mixer with a gap of 0.76 mm and running at 150 rpm. The shear rate experienced by the protein concentrate is 1,050 reciprocal seconds. The protein recovery equaled 85.2% based on the starting flour.

EXAMPLE III

A comparative process is conducted as stated in Example I. The rotor gap is 0.76 mm and is run at 627 rpm. The shear rate is 4,376 reciprocal seconds. The yield is 71.1% protein based on the starting flour.

EXAMPLE IV

A second comparative process, as stated in Example I is run using a pin-mill mixer (Oakes model 8MB3) having a 3.05 mm gap and running at 315 rpm. The shear rate is 1,099 reciprocal seconds. The protein yield based on the flour feed is 72.3%.

EXAMPLE V

A third comparative process, as described in Example I is run using a pin-mill type mixer (Oakes model 8MB3) run at 327 rpm having a gap of 1.52 mm. The shear rate is 2,282 reciprocal seconds. The protein yield is 76% of that in the starting flour.

EXAMPLE VI

The system, as in Example II is run using a pin-mill mixer (Oakes model 4MV3A) run at 525 rpm with a gap of 0.76 mm. The shear rate is 3,665 reciprocal seconds. Yield was determined to be 74.2% protein based on the feed flour.

EXAMPLE VII

A soy protein isolate is obtained comprising 10% protein in 90% water. The isolate is subjected to a shear rate of 900 reciprocal seconds and a gap of 0.51 mm. The soy isolate is screened and enhanced recovery is observed.

What is claimed is:

1. A process for agglomerating protein from cereal grain or soy beans comprising subjecting a protein concentrate which is a mixture of starch, protein and water to a shear to assist in agglomerating the protein wherein the maximum shear rate is not greater than 2000 reciprocal seconds and the protein concentrate during the shear is subjected to a gap of 2.28 mm or less to cause the protein to agglomerate.

2. The process of claim 1 wherein the mixture of starch, protein and water are present respectively at:
(a) from about 20% to about 35% by weight solids;
(b) from about 20% to about 40% by weight of (a) which is protein; and,
(c) from about 65% to about 80% by weight water.

3. The process of claim 1 wherein the maximum shear time is from about 0.3 to about 40 seconds.

4. The process of claim 1 wherein the shear is from about 1500 to about 100 reciprocal seconds.

5. The process of claim 3 wherein the maximum shear time is from about 0.4 to about 25 seconds.

6. The process of claim 4 wherein the maximum shear is from about 1000 to about 110 reciprocal seconds.

7. The process of claim 1 wherein the protein is derived from wheat.

8. The process of claim 1 wherein the shear is imparted by a pin-mill type mixer.

9. The process of claim 1 wherein the gap is from about 0.255 mm to 2.28 mm.

10. A process for agglomerating protein from cereal grain or soy beans comprising subjecting an aqueous starch-containing dispersion of protein to shear wherein the shear rate is not greater than 2000 reciprocal seconds and the aqueous dispersion is subjected to a gap of 2.28 mm or less during the shear to cause the protein to agglomerate.

11. The process of claim 10 wherein the protein is selected from wheat and soy protein.

12. The process of claim 10 wherein the gap is from about 0.255 mm to 2.28 mm.

* * * * *